US010565636B2

(12) United States Patent
Ito et al.

(10) Patent No.: US 10,565,636 B2
(45) Date of Patent: Feb. 18, 2020

(54) ELECTRONIC DEVICE, SYSTEM, AND METHOD

(71) Applicant: Toshiba Client Solutions CO., LTD., Koto-ku, Tokyo (JP)

(72) Inventors: Kei Ito, Kodaira Tokyo (JP); Kouetsu Wada, Nishitama Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 363 days.

(21) Appl. No.: 15/582,286

(22) Filed: Apr. 28, 2017

(65) Prior Publication Data

US 2017/0236181 A1   Aug. 17, 2017

Related U.S. Application Data

(63) Continuation of application No. PCT/JP2014/078779, filed on Oct. 29, 2014.

(51) Int. Cl.
*G06Q 30/06* (2012.01)
*G06F 16/951* (2019.01)
(Continued)

(52) U.S. Cl.
CPC ....... *G06Q 30/0629* (2013.01); *G06F 3/0653* (2013.01); *G06F 11/079* (2013.01);
(Continued)

(58) Field of Classification Search
CPC ............ G06Q 30/0631; G06Q 30/0629; G06F 16/951; G06F 16/9566; G06F 3/0653; G06F 11/079; G06F 11/0793; G06F 11/0766
(Continued)

(56) References Cited

U.S. PATENT DOCUMENTS 7,225,066 B2    5/2007  Yasuda
8,458,021 B1*   6/2013  Bous ................. G06Q 30/0635
                                                    705/14.1
(Continued)

FOREIGN PATENT DOCUMENTS

CN    103514147 A    1/2014
JP    2003-044126 A  2/2003
(Continued)

OTHER PUBLICATIONS

International Search Report and Written Opinion issued by Japan Patent Office dated Feb. 3, 2015 in the corresponding PCT application No. PCT/JP2014/078779.

*Primary Examiner* — Yogesh C Garg
(74) *Attorney, Agent, or Firm* — Knobbe, Martens, Olson & Bear, LLP

(57) ABSTRACT

According to one embodiment, an electronic apparatus includes a memory and a processor. The processor is coupled to the memory, and is configured to: receive first information including information indicative of a usage state of a device; detect a sign of mechanical failure of the device by analyzing the first information; acquire second information associated with a replacement product for the device of which the sign of mechanical failure is detected, the second information including information of at least one of an identical product and an alternative product to the device; and output the second information as information associated with the device of which the sign of mechanical failure is detected.

11 Claims, 5 Drawing Sheets

(51) Int. Cl.
  *G06F 16/955* (2019.01)
  *G06F 11/07* (2006.01)
  *G06F 3/06* (2006.01)
(52) U.S. Cl.
  CPC ...... *G06F 11/0766* (2013.01); *G06F 11/0793* (2013.01); *G06F 16/951* (2019.01); *G06F 16/9566* (2019.01)
(58) Field of Classification Search
  USPC .................................. 705/26.7, 26.44, 26.64
  See application file for complete search history.

(56) References Cited

U.S. PATENT DOCUMENTS

| | | | |
|---|---|---|---|
| 9,026,863 B2* | 5/2015 | Wu | G06F 11/3058 714/47.2 |
| 2003/0084131 A1 | 5/2003 | Yasuda | |
| 2003/0187757 A1* | 10/2003 | Ouchi | G06Q 10/087 705/28 |
| 2004/0220778 A1 | 11/2004 | Imai et al. | |
| 2007/0033525 A1 | 2/2007 | Numo et al. | |
| 2008/0010306 A1* | 1/2008 | Nagai | G03G 15/55 |
| 2013/0179631 A1 | 7/2013 | Cepulis | |
| 2015/0026549 A1 | 1/2015 | Shao | |
| 2015/0113320 A1 | 4/2015 | Honma et al. | |

FOREIGN PATENT DOCUMENTS

| | | |
|---|---|---|
| JP | 2003-058618 A | 2/2003 |
| JP | 2003-140737 A | 5/2003 |
| JP | 2007-317207 A | 12/2007 |
| JP | 2009-104322 A | 5/2009 |
| JP | 2012-198693 A | 10/2012 |
| JP | 2013-200755 A | 10/2013 |
| WO | WO 2004/104861 A1 | 12/2004 |
| WO | WO 2014/006728 A1 | 1/2014 |

* cited by examiner

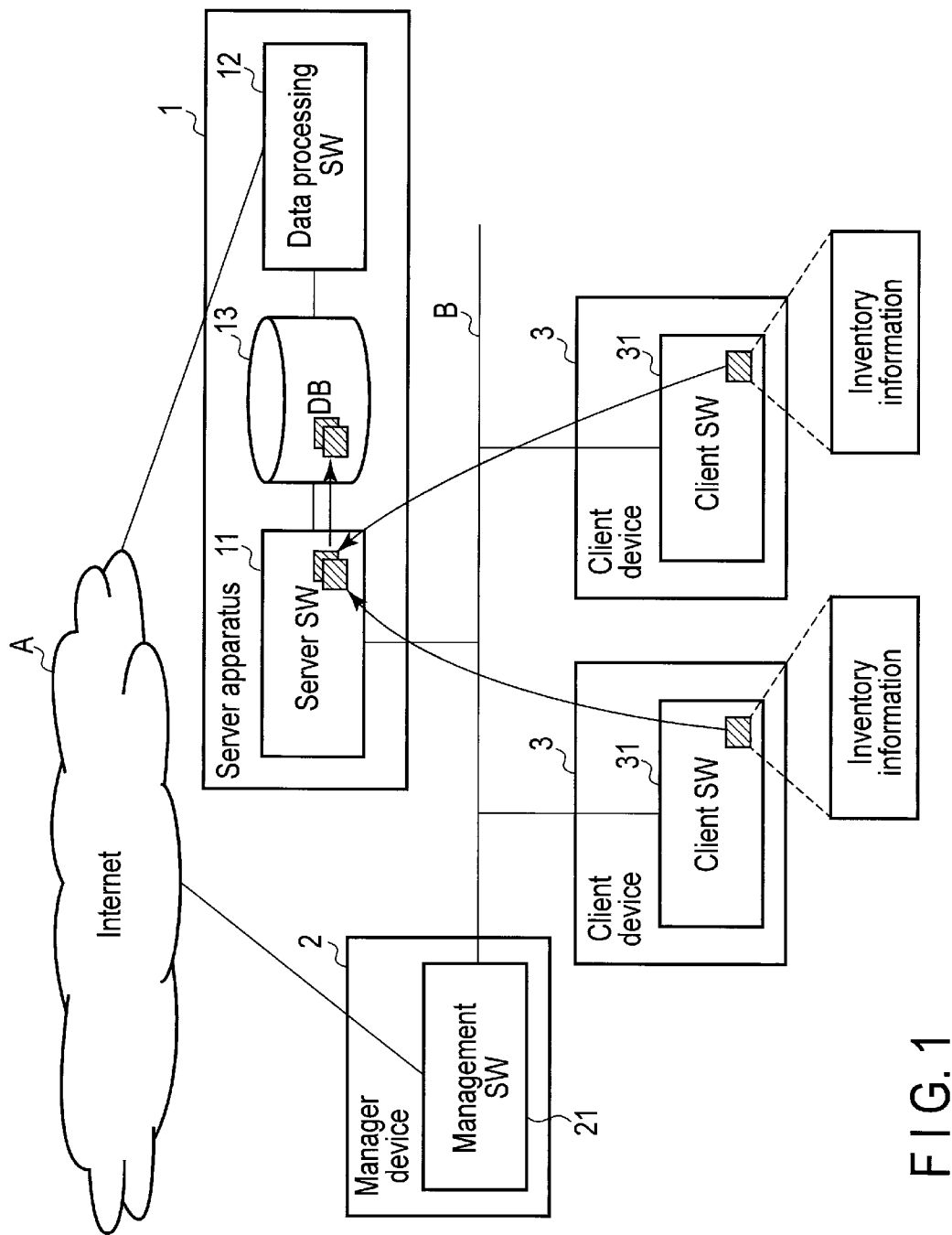
F I G. 1

| Health status | | | | | | | |
|---|---|---|---|---|---|---|---|
| Summary: Risk of mechanical failure ~a1~ ~a2~ | | | | | | | |

Summary:
Risk of mechanical failure

High a11: 2    Medium a12: 14    Low a13: 525    Unknown a14: Lack of data 38 / Excluded from management support targets 1080 / Others 6

List of events. a31 a21 Risk: ☑High ☐Medium ☐Low
a22 Time: ○One day ○One week ○One month ⊙Any a30

| | Status | Computer a32 | Device a33 | Date and time of status change a34 | Replacement a35 | URL a36 | Price a37 | Previous risk a38 |
|---|---|---|---|---|---|---|---|---|
| ☐ | ▣High | ABC_078 | HDD | 2014/10/09/ 8:45 | DE-0035 | http:ww.aaaa~ | yyyyy | |
| | | | | | FG-0072(∗) | http:ww.bbbb~ | yyyyy | ⚠ |
| ☐ | ▣High | ABC_215 | HDD | 2014/10/07/ 10:08 | HI-2053 | http:ww.cccc~ | yyyyy | |
| | ← | ← | ← | ← | JK-2248(∗) | http:ww.dddd~ | yyyyy | ⚠ |

F I G. 4

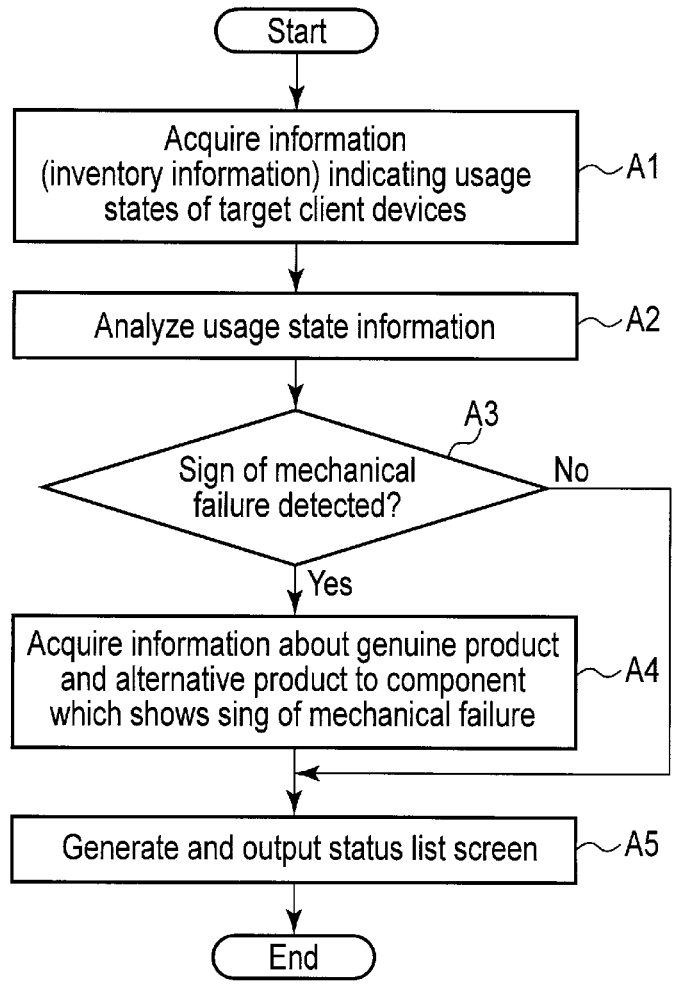
F I G. 5

ELECTRONIC DEVICE, SYSTEM, AND METHOD

CROSS-REFERENCE TO RELATED APPLICATIONS

This application is a Continuation Application of PCT Application No. PCT/JP2014/078779, filed Oct. 29, 2014, the entire contents of which are incorporated herein by reference.

FIELD

Embodiments described herein relate generally to an electronic device, a system, and a method.

BACKGROUND

Recently, in a company and the like, a management system for management of a plurality of terminal devices (hereinafter referred to as client devices) such as personal computers for business purposes has been used.

According to the management system, information (hereinafter referred to as inventory information) about information technology (IT) resources (hardware resources and software resources) of the client device can be collected from the client device, and based on the collected information, the IT resources in the company can be effectively managed, and consequently the management cost of the IT resources can be reduced.

More specifically, the management system can distribute a security patch and an application program to the client device, and can manage the working time based on the operating time of the client device, the license information about software, and the like.

Note that the inventory information collected in the management system includes information indicating the usage state of each component such as an HDD in the client device, and the like.

As described above, according to the management system, it is possible to understand the usage state of each component such as the HDD in the client device by collecting the inventory information. Therefore, it is also possible to detect a sign of mechanical failure of each component by analyzing the inventory information.

However, according to the conventional management system, when a sign of mechanical failure is detected in a component in a client device, the management system can simply present the client device comprising the component to the manager. Therefore, there is a case where the manager has to check the specification of the client device and search a replacement for the component, and the like.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a diagram showing an example of the structure of an IT resource management system comprising an electronic apparatus (server apparatus) of an embodiment.

FIG. 4 is a diagram showing an example of the status list screen to be presented to the manager device by the electronic apparatus (server apparatus) of the embodiment.

FIG. 5 is a flowchart showing the procedure of the operation related to the presentation of the status list screen in the electronic apparatus (server apparatus) of the embodiment.

DETAILED DESCRIPTION

Figure 2:
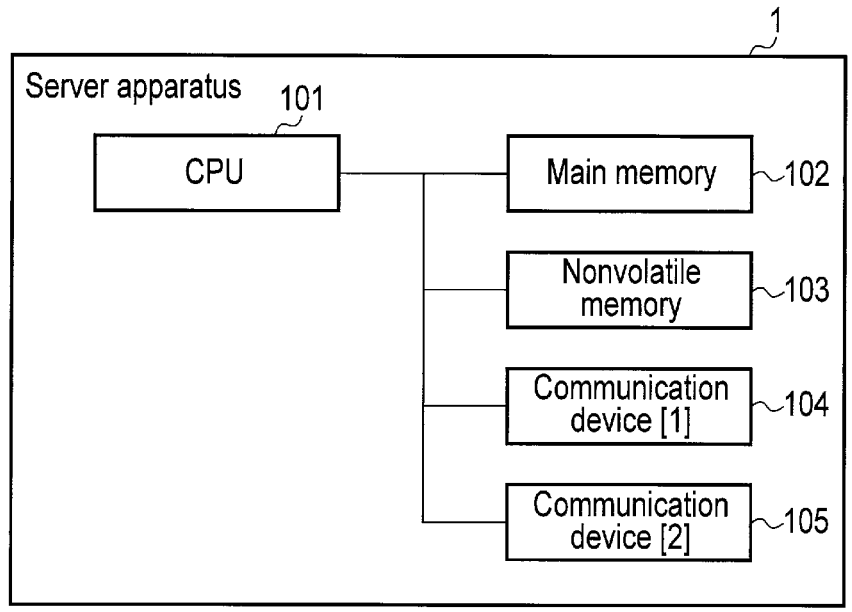
FIG. 2 is a schematic diagram showing the hardware structure of the electronic apparatus (server apparatus) of the embodiment.

Various embodiments will be described hereinafter with reference to the accompanying drawings.

In general, according to one embodiment, an electronic apparatus includes a memory and a processor. The processor is coupled to the memory, and is configured to: receive first information including information indicative of a usage state of a device; detect a sign of mechanical failure of the device by analyzing the first information; acquire second information associated with a replacement product for the device of which the sign of mechanical failure is detected, the second information including information of at least one of an identical product and an alternative product to the device; and output the second information as information associated with the device of which the sign of mechanical failure is detected.

FIG. 1 is a diagram showing an example of the structure of an IT resource management support system comprising an electronic apparatus (server apparatus) of the present embodiment. As shown in FIG. 1, the IT resource management support system includes a server apparatus 1, a manager device 2, and a plurality of client devices 3, and the server apparatus 1, the manager device 2, and the plurality of client devices 3 are connected to a local network B, respectively. Therefore, the server apparatus 1, the manager device 2, and the client devices 3 can communicate with each other via the local network B. Note that the client devices 3 are electronic devices (computers) such as personal computers, tablet computers, and smartphones which are used, for example, by employees of a company for business purposes and the manager device 2 is a computer which is used by a manager of the client devices 3. Further, it is assumed that the server apparatus 1 and the manager device 2 are also connected to the Internet A.

Server software 11 and data processing software 12 run on the server apparatus 1. Further, management software 21 runs on the manager device 2. Still further, client software 31 runs on the client device 3. Still further, a database 13 which stores various kinds of information including inventory information which will be described later is provided in the server apparatus 1.

The client software 31 comprises an instruction for acquiring information about the IT resources, that is, the inventory information about the client device 3 (on which the client software 31 runs) and transmitting the inventory information to the server software 11. The instruction may be executed every predetermined time or may be executed in response to the request from the management software 21. The inventory information includes, for example, information indicating the usage state of each component such as an HDD in the client device 3.

Firstly, the server software 11 comprises an instruction for receiving the inventory information from the client software 31 and storing the received inventory information in the database 13. Further, firstly, the data processing software 12 comprises an instruction for analyzing the inventory information which is stored in the database 13 and detecting a sign of mechanical failure of each component such as the HDD in the client device 3. As the methods for detecting a sign of mechanical failure of each component, various existing detection methods can be adopted. For example, in the case of the HDD, it is possible to detect a sign of mechanical failure by determining whether the number of accesses exceeds a threshold value.

Secondly, the data processing software 12 comprises an instruction for searching a replacement for a component which shows a sign of mechanical failure via the Internet A. To search a replacement, for example, a model number or the like is extracted from the inventory information, and a search request (query) is generated and transmitted to a website which offers an information search service such as a search site on the Internet. Depending on search request (query) generation methods, not only an identical product (genuine product) but also an alternative product can be searched as a replacement. Note that the server apparatus 1 may have such a search function as that of a search site.

Further, the management software 21 comprises an instruction for providing a user interface which supports the management of the IT resources of the client devices 3 in cooperation with the server software 11. Among the user interfaces provided by the management software 21, there is a user interface which presents a list of the statuses of the client devices 3. When an operation for the presentation of the status list screen is performed on the manager device 2 (on which the manager software 21 runs), a request of transmission of a status list screen is transmitted from the management software 21 to the server software 11, and a status list screen which is received from the server software 11 is presented on the manager device 2.

That is, secondly, the server software 11 comprises an instruction for receiving the request of transmission of the status list screen from the management software 21, generating the requested status list screen, and transmitting the generated status list screen to the management software 21. More specifically, if the request of transmission of the status list screen from the management software 21 is received by the server software 11, analysis of the inventory information is requested to the data processing software 12 by the server software 11. In response to the request, the inventory information is analyzed by the data processing software 12, and if a sign of mechanical failure is detected in a component in a client device 3, a replacement for the component is searched by the data processing software 12 via the Internet A. A result of the analysis of the inventory information and a result of the search of the component are transmitted to the server software 11 by the data processing software 12. Then, based on the result of the analysis of the inventory information and the result of the search of the component by the data processing software 12, the status list screen is generated and transmitted to the management software 21 by the server software 11.

The general structure of an example of the IT resource management support system has been described.

FIG. 2 is a schematic diagram showing the hardware structure of the server apparatus 1.

As shown in FIG. 2, the server apparatus 1 includes a CPU 101, a main memory 102, a nonvolatile memory 103, a first communication device 104, and a second communication device 105.

The CPU 101 is a processor which controls the operations of various components in the server apparatus 1. The CPU 101 loads various kinds of software from the nonvolatile memory 103 into the main memory 102. The software includes the server software 11 and the data processing software 12. The software also includes basic software such as an operating system. The server software 11 and the data processing software 12 run under the control of the operating system. Note that various storage devices such as an HDD and an SSD can be adopted as the nonvolatile memory 103. The database 13 shown in FIG. 1 is provided inside the nonvolatile memory 103.

The first communication device 104 performs communication with an external device via the Internet A. Further, the second communication device 105 performs communication with an external device via the local network B.

Figure 3:
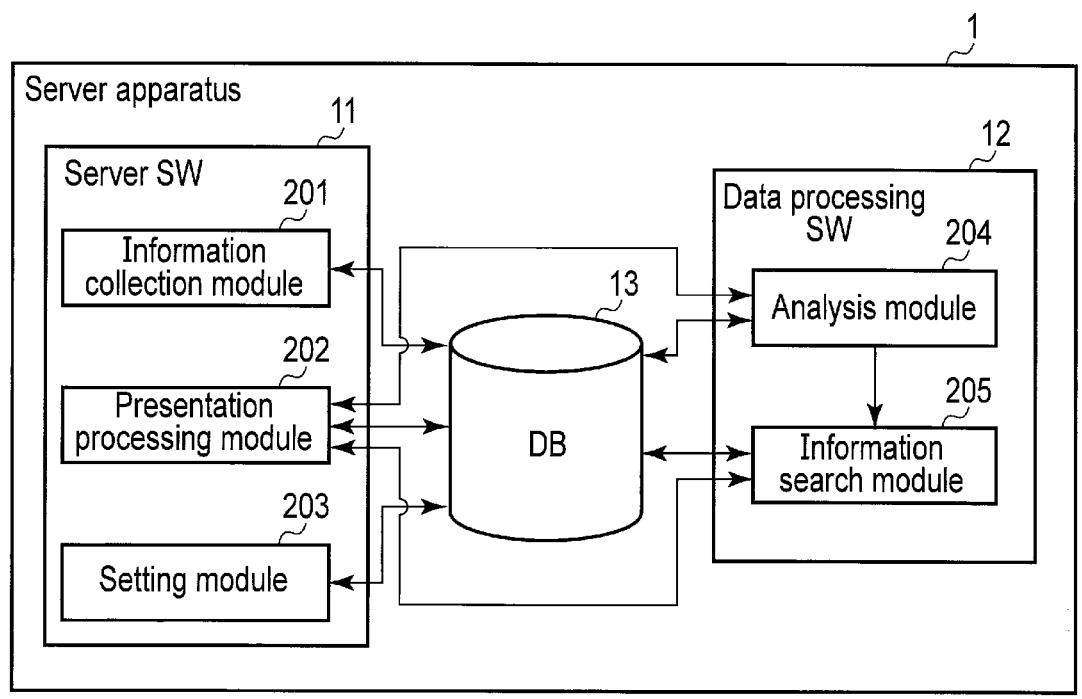
FIG. 3 is a schematic diagram showing the software structure of the electronic apparatus (server apparatus) of the embodiment.

FIG. 3 is a schematic diagram showing the software structure of the server apparatus 1.

As described above, the server software 11 and the data processing software 12 run on the server apparatus 1. As shown in FIG. 3, the server software 11 includes an information collection module 201, a presentation processing module 202, and a setting module 203. Further, the data processing software 12 includes an analysis module 204 and an information search module 205.

The information collection module 201 is a module for receiving the inventory information from the client software 31 and storing the received inventory information in the database 13. Further, the presentation processing module 202 is a module for receiving the request of transmission of the status list screen from the management software 21, generating the requested status list screen, and transmitting the generated status list screen to the management software 21. Note that the setting module 203 will be described later.

The analysis module 204 is a module for analyzing the inventory information which is stored in the database 13, and detecting a sign of mechanical failure of each component such as the HDD in the client device 3. Further, the information search module 205 is a module for searching the replacement for the component which shows a sign of mechanical failure via the Internet A.

FIG. 4 is a diagram showing an example of the status list screen which is generated in the server apparatus 1 according to the request from the manager device 2 and is presented to the manager device 2.

As shown in FIG. 4, the display area of the status list screen includes two display areas, namely, a summary display area a1 and an event list display area a2. In the summary display area a1, according to the levels of risk of mechanical failure, icons (a11, a12, and a13) indicating the total numbers of the client devices 3, each of which includes a component in which a sign of mechanical failure is detected by the analysis module 204 of the data processing software 12, are displayed, respectively. In other words, these icons a11, a12 and a13 are arranged in the summery display area a1 by the presentation processing module 202 of the server software 11 based on the result of the analysis of the inventory information which is received from the analysis module 204. Note that, for example, an icon (a14) indicating the total number of the client devices 3 whose data is not sufficiently acquired or whose analysis data is not acquired because the client devices 3 are excluded from the management support targets or the like may also be displayed.

In the meantime, a group of risk selection buttons a21, and a group of time selection buttons a22 are displayed in the event list display area a2. In the group of risk selection buttons a21, as any one of a "high" level of risk, a "medium" level of risk, a "low" level of risk and an "any" level of risk is specified, the display target in the event list display area a2 can be specified, accordingly. Similarly, in the group of time selection buttons a22, as any one of a sign detection time of "one day", a sign detection time of "one week", a sign detection time of "one month" and an "any" sign detection time is be specified, the display target in the event list display area a2 can be specified, accordingly. For example, if the "high" level of risk of mechanical failure is specified in the group of list selection buttons a21 and the sign detection time of "one day" is specified in the group of time selection buttons a22, the display target will be a client device 3 including a component showing a sign of mechanical failure, wherein the level of risk of mechanical failure has changed, for example, from the "medium" level to the "high" level within "one day".

The display target in the event list display area a2 is provisionally determined by the presentation processing module 202 of the server software 11 by setting the initial level of risk to the "high" level and the initial sign detection time to the "any" sign detection time. FIG. 4 shows a display example of the status list screen in a case where the level of risk is set to the "high" level and the sign detection time is set to the "any" sign detection time. If the group of risk selection buttons a21 or the group of time selection buttons a22 is operated in the manager device 2 to which the status list screen is presented, the content of the operation is reported to the server software 11 (presentation processing module 202) of the server apparatus 1 by the management software 21.

Further, in the event list display area a2, a list of the client devices 3, each of which includes a component showing a sign of mechanical failure and is specified as a display target according to the operation on the group of risk selection buttons a21 and the operation on the group of time selection buttons a22, is displayed as an event list a30. As shown in FIG. 4, the event list a30 includes a "status" column a31, a "computer" column a32, a "device" column a33, a "data and time of status change" column a34, a "replacement" column a35, a "URL" column a36, a "price" column 37, a "previous risk" column a38, and the like.

In the "status" column a31, the level of risk of mechanical failure according to the detected sign of mechanical failure is shown. In the "computer" column a32, the identifier (for example, the preliminarily-added mnemonic code) of the client device 3 including the component which shows a sign of mechanical failure is shown. In the "device" column a33, the type of component which shows a sign of mechanical failure (for example, the generic name of the device such as the HDD) is shown. In the "date and time of status change" column a34, the time when the level of risk of mechanical failure according to the detected sign of mechanical failure is changed to the level shown in the "status" column a31 is shown.

Further, in the "replacement" column a35, the replacement (for example, the model number) which is searched by the information search module 205 of the data processing software 12 for the component which shows a sign of mechanical failure is shown. As described above, depending on search request (query) generation methods, not only an identical product (genuine product) but also an alternative product can be searched as the replacement. Searched replacements are presented by the presentation processing module 202 of the server software 11 within the predetermined upper limit of the number of replacements to be presented at a time. Here, the upper limit of the number of replacements to be presented is assumed to be two. In the presentation of the alternative product, a symbol, for example, "*" may be added as an indication of the alternative product.

In the search of the replacement, the URL of the supplier of the replacement and the price of the replacement are searched by the information search module 205 of the data processing software 12. At this time, the supplier and the price of the replacement may be simply searched by the search request (query) for the replacement, or after the replacement is searched, the search request (query) for the supplier and the price of the replacement may be newly generated, and the supplier and the price of the replacement may be separately searched. In the "URL" column a36 and the "price" column a37, the URL of the searched supplier and the searched price of the replacement are shown, respectively. Searched replacements may be presented by the presentation processing module 202 of the server software 11 within the upper limit of the number of replacements to be presented, for example, in ascending order according to price. As described above, since the manager device 2 is also connected to the Internet A, the manager can effectively prepare the replacement with reference to the URL shown in the "URL" column a36 and the price shown in the "price" column a37.

Note that, in the "previous risk" column a38, the level of risk of mechanical failure of each component of when the previous analysis of the inventory information which is stored in the database 13 is performed by the analysis module 204 of the data processing software 12 is shown.

The setting module 203 of the server software 11 is a module for making (allows the manager to make) various settings related to the status list screen cooperates with the management software 21. For example, it is possible to make settings such as a setting for the above-described upper limit of the number of replacements to be presented and a setting for the priority of presentation. As the priority of presentation, instead of presenting replacements in ascending order according to price, for example, the highest priority may be assigned to an identical product (genuine product), if any, and then alternative products may be presented in ascending order according to price. Further, (for example, to present new products as the highest priority), replacements may be presented in reverse chronological order according to on-sale date. For example, these settings are stored in the database 13 and referred by the presentation processing module 202.

In this way, the IT resource management system of the present embodiment does not simply present a component which shows a sign of mechanical failure or a client device including the component, but the IT resource management system of the present embodiment also presents an identical product or an alternative product as a replacement for the component and even suggests a replacement for the component according to price and the like.

FIG. 5 is a flowchart showing the procedure of the operation related to the presentation of the status list screen in the server apparatus 1.

The inventory information is received from the client software 31 and is stored in the database 13 by the information collection module 201 of the server software 11 (block A1). When the request of transmission of the status list screen is received from the management software 21 by the presentation processing module 202 of the server software 11, the inventory information stored in the database 13 is analyzed by the analysis module 204 of the data processing software 12 (block A2).

If a sign of mechanical failure in any components provided in any client devices 3 is detected by the analysis module 204 of the data processing software 12 (Yes in block A3), information about the replacement, more specifically, the identical product (genuine product) and the alternative product is acquired by the information search module 205 of the data processing software 12, by transmitting the search request (query) to the website on the Internet A, for example (block A4).

Then, the status list screen is generated based on the analysis result of the analysis module 204 and the search result of the information search module 205 of the data processing software 12 and is transmitted to the management software 21 by the presentation processing module 202 of the server software 11 (block A5). In the meantime, among the client devices 3 as the management support targets, some client devices 3 may be having trouble performing communication with the server apparatus 1 for some reason or other. In these client devices 3, for example, the inventory information cannot be transmitted to the server software 11 by the client software 31 in response to the request from the management software 21. These client devices 3 is temporarily excluded from the targets of the processing of the analysis module 204 and the information search module 205 by the data processing software 12. The total number of these client devices 3 is presented, for example, as an icon a14 ("unknown") in the status list screen shown in FIG. 4 by the server software 11.

As described above, according to the IT resource management support system of the present embodiment, the IT resources can be effectively managed.

Figure 6:
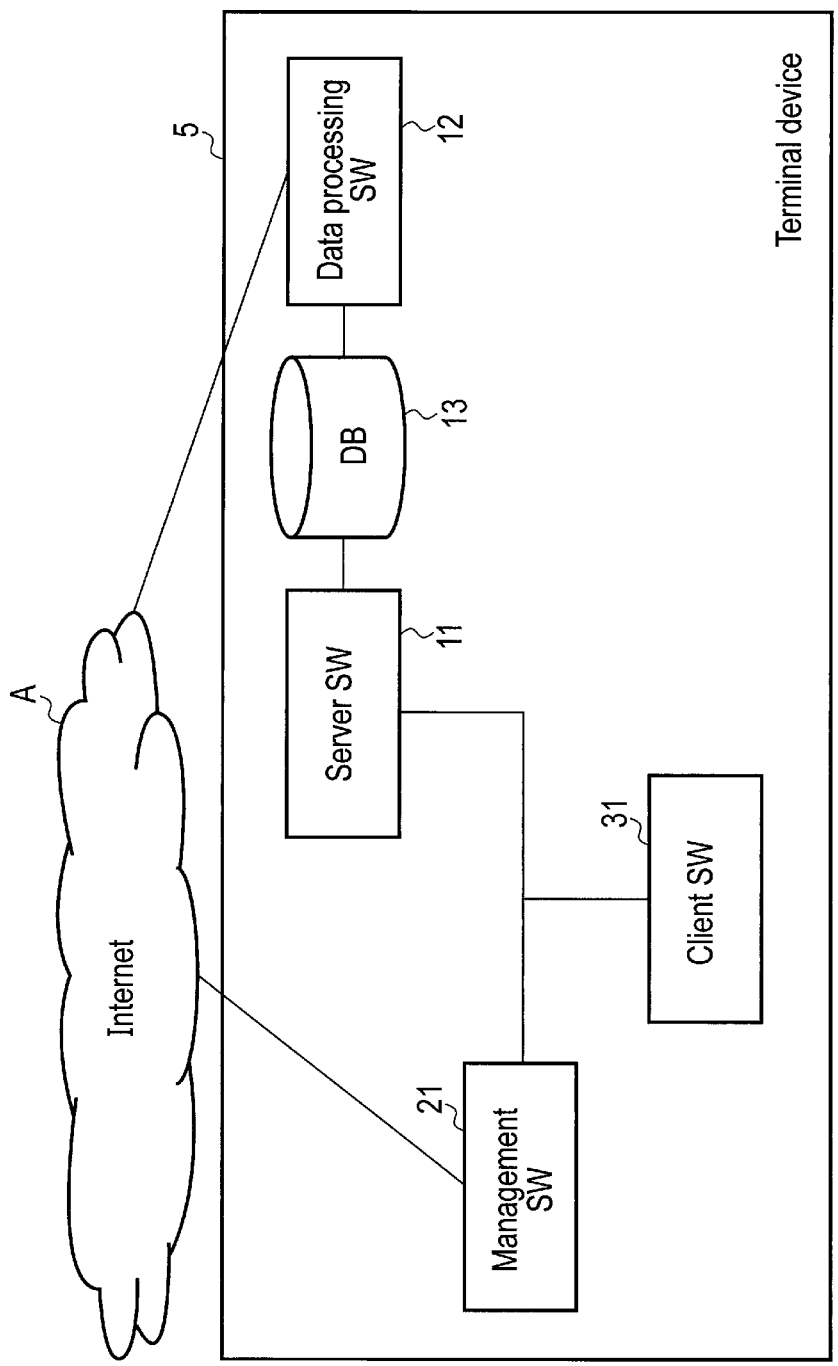
FIG. 6 is a diagram showing a standalone IT resource management system as a modification of the embodiment.

Note that, in the above-described embodiment, the IT resource management support system includes the server apparatus 1, the manager device 2, and the plurality of client devices 3 which are connected to the local network B, respectively. However, the above-described embodiment is in no way restrictive, and for example, as shown in FIG. 6, the server software 11, the data processing software 12, the database 13, the management software 21, and the client software 31, or the corresponding functions may be provided in a device such as a personal computer, and in this way, the embodiment may be implemented as a standalone IT resource management support.

Further, in the above-described embodiment, the inventor information is analyzed and the replacement is searched by the server software 11 when the request of transmission of the status list screen from the management software 21 is received by the server software 11. However, the above-described embodiment is in no way restrictive, and for example, instead of waiting the request of transmission of the status list screen from the management software 21, the inventory information may be analyzed and the replacement may be searched at regular intervals by the server software 11, and the analysis result and the search result may be stored in the database 13. In that case, when receiving the request of transmission of the status list screen from the management software 21, the status list screen can be generated based on the result of the analysis of the inventory information and the result of the search of the replacement which are stored in the database 13, and transmitted to the management software 21 by the server software 11. Still further, even if a sign of mechanical failure is not detected yet, a replacement may be searched and stored in the database 13 beforehand. Still further, instead of searching a replacement on its own apparatus, it is also possible to receive information about a replacement and store the information about the replacement in the database 13.

Since each process of the present embodiment can be implemented by software, it is possible to easily achieve the same advantage as that achieved by the present embodiment by installing the software into an ordinary computer through a computer-readable storage medium.

Further, each module of the system may be realized as a software application, a hardware and/or software module, or one or more components of a computer such as a server. Still further, each module is realized as an independent module in the present embodiment, but some or all of the same basic logics or codes may be shared with these modules.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a database in which inventory information is stored, the inventory information comprising information indicative of a usage state of various components in the electronic apparatus, and being acquired at a predetermined timing or in response to a request;
   a processor configured to detect a sign of mechanical failure of the various components by analyzing the inventory information stored in the database, and search for a replacement product or an alternative product for a component of which the sign of mechanical failure is detected; and
   a display configured to display a status list including a result of the analysis of the inventory information and a result of the search of the replacement product or the alternative product.

2. The electronic apparatus of claim 1, wherein the processor is configured to generate a search request by extracting a model number of the component of which the sign of mechanical failure is detected from the inventory information, and execute the search by transmitting the search request to a website on the Internet, which offers an information search service.

3. A system comprising:
   a manager device configured to support a management of IT resources of client devices; and
   a server which comprises a database in which inventory information is stored,
   wherein the server is configured to
      store the inventory information in the database, the inventory information comprising information indicative of a usage state of various components in the client devices, and being acquired at a predetermined timing or in response to a request from the manager device;
      analyze the inventory information stored in the database in response to a request from the manager device,
      when a sign of mechanical failure is detected by the analysis, search for a replacement product or an alternative product for a component of which the sign of mechanical failure is detected; and
      generate a status list including a result of the analysis of the inventory information and a result of the search of the replacement product or the alternative product, and transmit the status list to the manager device.

4. The system of claim 3, wherein the processor is configured to generate a search request by extracting a model number of the component of which the sign of mechanical failure is detected from the inventory information, and to execute the search by transmitting the search request to a website on the Internet, which offers an information search service.

5. The system of claim 3, wherein the status list includes icons indicative of total number of the client devices of which the sign of mechanical failure of a component is detected, the icons being displayed in the status list according to levels of risk of mechanical failure.

6. The system of claim 3, wherein the request from the manager device includes a level of risk of mechanical failure and a period of time.

7. The system of claim 3, wherein the result of the search of the replacement product or the alternative product includes information associated with a Uniform Resource Locator (URL) of a supplier and a price.

8. A method executed by an electronic apparatus, the method comprising:
  storing inventory information in a database, the inventory information comprising information indicative of a usage state of various components in the electronic apparatus, and being acquired at a predetermined timing or in response to a request;
  detecting a sign of mechanical failure of the various components by analyzing the inventory information stored in the database;
  searching for a replacement product or an alternative product for a component of which the sign of mechanical failure is detected; and
  displaying a status list including a result of the analysis of the inventory information and a result of the search of the replacement product or the alternative product.

9. The method of claim 8, further comprising generating a search request by extracting a model number of the component of which the sign of mechanical failure is detected from the inventory information; and executing the search by transmitting the search request to a website on the Internet, which offers an information search service.

10. A method executed by a system comprising a manager device and a server, the manager device configured to support a management of IT resources of client devices, the server comprising a database in which inventory information is stored, the method comprising:
  storing the inventory information in the database, the inventory information comprising information indicative of a usage state of various components in the client devices, and being acquired at a predetermined timing or in response to a request from the manager device;
  analyzing the inventory information stored in the database in response to a request from the manager device;
  when a sign of mechanical failure is detected by the analysis, searching for a replacement product or an alternative product for a component of which the sign of mechanical failure is detected; and
  generating a status list including a result of the analysis of the inventory information and a result of the search of the replacement product or the alternative product, and transmitting the status list to the manager device.

11. The method of claim 10, further comprising generating a search request by extracting a model number of the component of which the sign of mechanical failure is detected from the inventory information; and executing the search by transmitting the search request to a website on the Internet, which offers an information search service.

* * * * *